United States Patent
Jo et al.

(10) Patent No.: US 6,810,980 B2
(45) Date of Patent: Nov. 2, 2004

(54) DRIVER PROTECTION STRUCTURE AND A DEVICE SUPPORTING THE SAME

(75) Inventors: Chun Ho Jo, Changwon (KR); Chun Jin Yoon, Changwon (KR)

(73) Assignee: Volvo Construction Equipment Holding Sweden AB (SE)

( * ) Notice: Subject to any disclaimer, the term of this patent is extended or adjusted under 35 U.S.C. 154(b) by 61 days.

(21) Appl. No.: 10/212,531

(22) Filed: Aug. 5, 2002

(65) Prior Publication Data

US 2003/0111281 A1 Jun. 19, 2003

(30) Foreign Application Priority Data

Dec. 18, 2001 (KR) .......................................... 2001-80589

(51) Int. Cl.⁷ .............................................. B62D 33/06
(52) U.S. Cl. .................................................. 180/89.13
(58) Field of Search ........................... 180/89.13, 89.1, 180/89.11, 311; 296/190.01, 190.04, 190.05, 190.06, 190.08, 203.01

(56) References Cited

U.S. PATENT DOCUMENTS

| | | | | |
|---|---|---|---|---|
| 4,075,788 A | * | 2/1978 | Anderson | ..................... 49/324 |
| 4,116,483 A | * | 9/1978 | Kramer et al. | ........... 296/190.1 |
| 4,451,079 A | * | 5/1984 | Takahashi | .............. 296/190.07 |
| 5,921,033 A | * | 7/1999 | Molina | .......................... 52/67 |
| 5,984,036 A | * | 11/1999 | Higuchi et al. | .......... 180/89.12 |
| 6,374,935 B1 | * | 4/2002 | Kirschenmann et al. | . 180/89.12 |
| 6,439,651 B1 | * | 8/2002 | Johansson et al. | ..... 296/190.07 |

* cited by examiner

Primary Examiner—Faye M. Fleming
(74) Attorney, Agent, or Firm—Harness, Dickey & Pierce, P.L.C.

(57) ABSTRACT

The present invention relates to a driver protection structure and a device supporting the same which secure driver's safety according to the international standardization organization when collided with a falling object and upon equipment's rollovers, comprising a first stopper which allows a driver's cabin and the driver protection structure mounted over the driver's cabin to move in a vertical direction and restricts the driver's cabin to move in a horizontal direction, and a second stopper which allows the driver's cabin to move in the vertical direction and restricts the driver's cabin to be lifted when a load is applied to the driver's cabin from external.

9 Claims, 3 Drawing Sheets

DRIVER PROTECTION STRUCTURE AND A DEVICE SUPPORTING THE SAME

BACKGROUND OF THE INVENTION

1. Field of the Invention

The present invention relates to a driver protection structure and a device supporting the same which are mounted outside a driver's cabin to enable driver's safety to be secured in case that an object falls toward the driver's cabin from outside or equipment is rolled over, and more particularly to a driver protection structure coupled in one body with the driver's cabin and to a support device overcoming an impact transferred to the driver protection structure.

2. Description of Prior Art

According to the International Standardization Organization(ISO), a driver protection structure mounted outside a driver's cabin of heavy equipment includes a falling-over protective structure(FOPS) preventing falling objects from being invaded within a range of driver's work in order to protect a driver, and a roll-over protective structure protecting a driver in case that equipment is rolled over.

FIG. 1 is a view for schematically showing an upper side of heavy equipment over which a conventional driver protection structure is mounted.

In the convention structure as shown in FIG. 1, the upper side of heavy equipment an upper frame 1 mounted over a lower traveling body(not shown) of heavy construction equipment, a driver's cabin 3 mounted on the upper frame 1, vibration-absorbing devices 6a and 6b mounted between the upper frame and a bottom plate 5 of the driver's cabin, and driver protection structures 4a and 4b fixed by fixtures such as welding and the like to brackets 2a and 2b installed on the front and rear of the upper frame.

However, the above structure requires an upper frame for standard equipment and an upper frame for a driver protection structure, to thereby increase manufacture and management costs.

Further, there exist difficulties in repeatedly removing and mounting the driver protection structure according to work conditions.

In the meantime, in case that the driver protection structures 4a and 4b is installed in one body with the driver's cabin in order to the above problems, very a large load in a horizontal or vertical direction, upon a collision with a falling object or rollover, is conveyed through the driver protection structures 4a and 4b, driver's cabin 3, bottom plate 5, vibration-absorbing devices 6a and 6b, and upper frame 1 in order.

However, the vibration-absorbing devices 6a and 6b do not have the strength enough to absorb such a big load, which causes a problem the driver protection structures 4a and 4b can not be directly installed over the driver's cabin 3.

SUMMARY OF THE INVENTION

Accordingly, it is an object of the present invention to provide a driver protection structure mounted over a driver's cabin and a supporting device capable of overcoming an impact conveyed to the driver's cabin in case that the impact is applied to the driver protection structure.

It is another object of the present invention to provide a driver protection structure easily detachable to wash front glass of a driver's cabin.

In order to achieve the above objects, in a driver protection structure for heavy equipment and a device supporting the same which have an upper frame mounted over a lower traveling body, a driver's cabin mounted on the upper frame, and a vibration-absorbing device mounted between the upper frame and a bottom plate of the driver's cabin, the driver protection structure and the device supporting the same comprises a driver protection structure mounted over the driver's cabin and having a roof protection structure and a front protection structure; a first stopper allowing the driver's cabin to move in a vertical direction and restricting the same to move in a horizontal direction, when an external impact is applied to the driver protection structure; and a second stopper restricting the movement of the driver's cabin in the vertical direction in a certain range when the external load is applied to the driver protection structure.

In an embodiment of the present invention, the front protection structure is hinged to the roof protection structure fixed to an upper side of the driver's cabin, enabling openings and closings thereof with rotations about a hinge axis, a gas spring is further included between the front protection structure and the driver's cabin to facilitate the openings and closings of the front protection structure.

In another embodiment of the present invention, the first stopper is a protrusion protruded from the bottom plate of the driver's cabin, the protrusion being blocked by a step formed on the upper frame, or the first stopper is a protrusion protruded from the upper frame, the protrusion being blocked by a step formed on the bottom plate of the driver's cabin.

In another embodiment of the present invention, one end of the second stopper passes through a through-hole formed in the upper frame and is fixed in one body to the bottom plate of the driver's cabin, and the other end thereof is a bolt formed with a separation-preventing step, or one end of the second stopper passes through a through-hole formed in the bottom plate of the driver's cabin and is fixed in one body to the upper frame, and the other end thereof is a bolt formed with a separation-preventing step.

In another embodiment of the present invention, the first stopper is mounted in the rear of the bottom plate of the driver's cabin and the second stopper is mounted in the front of the bottom plate of the driver's cabin.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF PREFERRED EMBODIMENT

Hereinafter, a preferred embodiment of the present invention is described in detail with reference to the accompanying drawings, which does not mean defining the technical spirit and scope of the present invention but is for explaining in detail the present invention in order for one skilled in the art to which the present invention pertains to implement the present invention.

Figure 1:
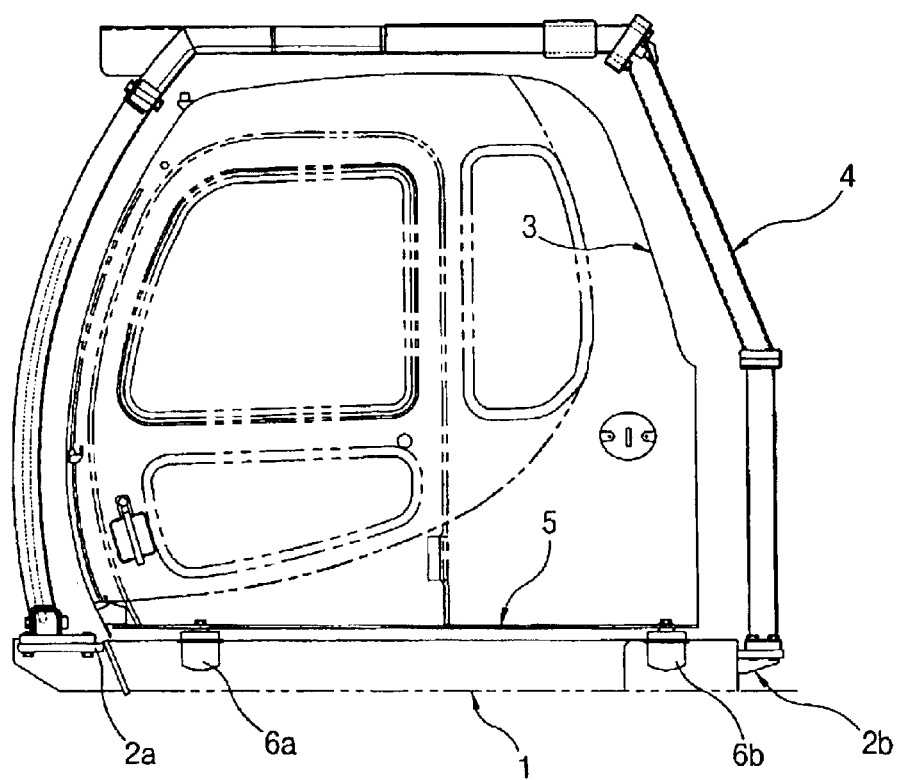
FIG. 1 is a view for schematically showing a state that a conventional driver protection structure is mounted over an upper side of heavy equipment.
Figure 2:
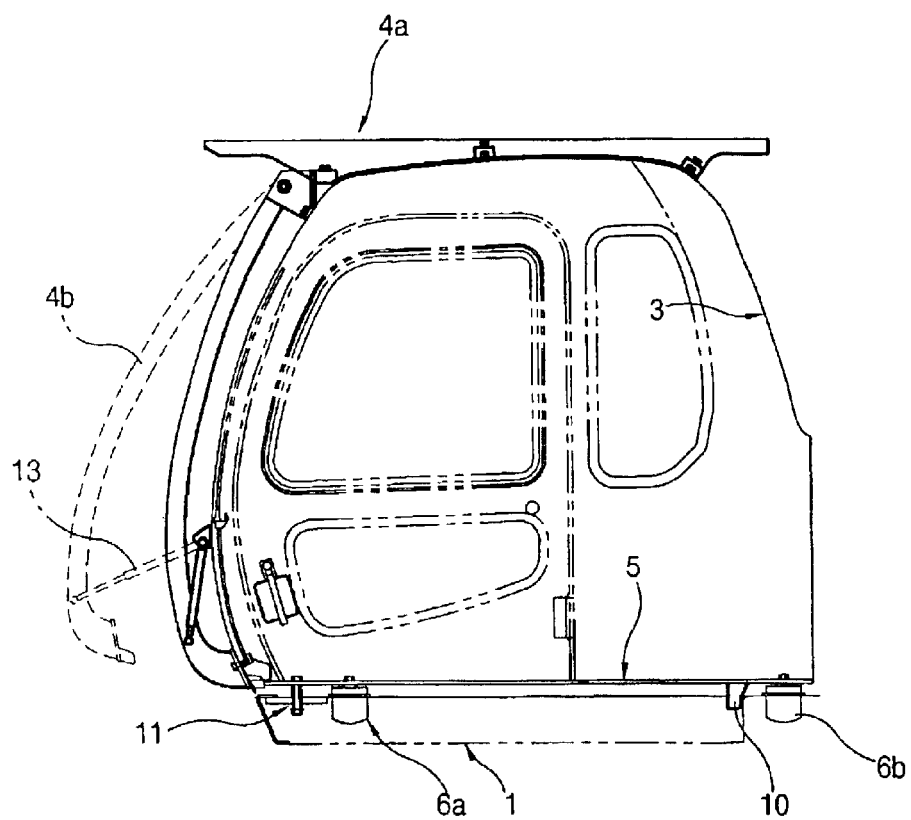
FIG. 2 is a view for schematically showing a driver protection structure mounted over a driver's cabin and a device supporting the same according to an embodiment of the present invention.
Figure 3:
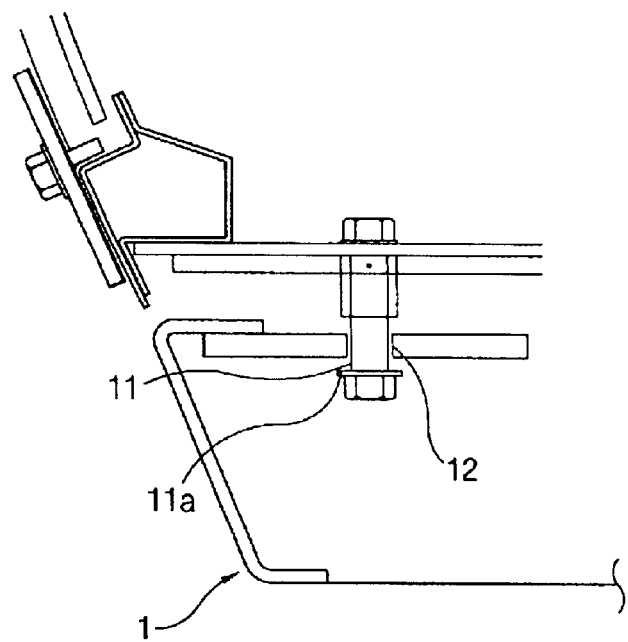
FIG. 3 is an enlarged view about a first stopper 11 of FIG. 2.

As shown in FIG. 2, an upper side of heavy equipment having a driver protection structure mounted over a driver's cabin and a device supporting the same according to an embodiment of the present invention includes an upper frame 1 mounted on a lower traveling body(not shown), a driver's cabin 3 mounted on the upper frame 1, vibration-absorbing devices 6a and 6b mounted between the upper frame 1 and a bottom plate 5 of the driver's cabin 3, driver protection structures 4a and 4b mounted over the driver's cabin 3 of heavy equipment capable of securing driver's safety, and a supporting device having a first stopper 10 and a second stopper 11. The components shown in FIG. 1 have the same reference numerals.

The driver protection structure has a roof protection structure 4a fixed to the upper side of the driver's cabin 3 and a front protection structure 4b spaced in a certain interval as to a front glass of the driver's cabin 3. The front protection structure 4b is hinged to the roof protection structure 4a so as to be rotated about a hinge axis, enabling to be opened and closed, and a gas spring is mounted between the front protection structure 4b and the driver's cabin 3 to facilitate the opening and closing of the front protection structure 4b.

The first stopper 10 is a protrusion blocked by a step portion formed on the upper frame 1 and supports the driver's cabin 3 in a horizontal direction in case that an object falls on it, the protrusion being protruded from the rear of the bottom plate 5 of the driver's cabin 3. The first stopper 10 is spaced from the upper frame 1 in order for the driver's cabin 3 to move in a certain range in a vertical direction when a load is applied to the driver's cabin 3 from external.

The first stopper 10 is protruded from the upper frame 1 to carry out the same function and may be a protrusion blocked by a step formed on the bottom plate 5 of the driver's cabin 3.

One end of the second stopper 11 passes through a through-hole 12 formed in the upper frame 1 and is fixed in one body in front of the bottom plate 5 of the driver's cabin 3, and the other end thereof is a bolt formed with a separation-preventing step 11a, preventing the driver's cabin 3 from being lifted from the upper frame 1 beyond a certain range in case that the driver's cabin receives force in an upward direction.

One end of the second stopper 11 passes through a through-hole formed in the bottom plate 5 of the driver's cabin and is fixed in one body with the upper frame 1 and the other end thereof may be a bolt formed with a separation-preventing step, to carry out the same function.

Hereinafter, the mounting procedures for a load-supporting device of the driver protection structure installed over the driver's cabin according to the present invention are described in detail with reference to the accompanying drawings.

Firstly, vibration-absorbing devices 6a and 6b are mounted in the front and rear of the upper frame 1 which is installed on the lower traveling body(not shown) of heavy equipment.

Secondly, the first stopper 10 is fixedly coupled to the bottom plate 5, and then the bottom plate 5 is fixed to the vibration-absorbing devices 6a and 6b.

Thirdly, the second stopper 11 in the lower side of which separation-preventing steps preventing the driver's cabin from being separated from the through-hole 12 when the driver's cabin is lifted are formed is fixed to the bottom plate 5 through the through-hole 12 formed in the upper frame 1.

Fourthly, the driver's cabin 3 is mounted on the bottom plate 5.

Fifthly, the driver protection structure 4a is mounted over the roof of the driver's cabin 3, and the front protection structure 4b is mounted with a gap from the front glass in the front of the driver's cabin 3.

In the above structure, impact exerted when an object falls on it or when equipment is rolled over is conveyed in order of the driver protection structures 4a and 4b, driver's cabin 3, bottom plate 5, and first and second stoppers 10 and 11, so that, even in case that the driver protection structures 4a and 4b is installed in one body with the driver's cabin 3, the vibration-absorbing devices 6a and 6b can absorb vibrations occurring in upward and downward directions, supporting a load of the driver protection structures 4a and 4b.

The entire disclosure of Korean Application No. 2001-80589, filed Dec. 18, 2001 is hereby incorporated by reference.

What is claimed is:

1. In a driver protection structure for heavy equipment and a device supporting the same which have an upper frame mounted over a lower traveling body, a driver's cabin mounted on the upper frame, and a vibration-absorbing device mounted between the upper frame and a bottom plate of the driver's cabin, the driver protection structure and the device supporting the same comprising:

a driver protection structure mounted over the driver's cabin and having a roof protection structure and a front protection structure;

a first stopper allowing the driver's cabin to move in a vertical direction and restricting the same to move in a horizontal direction, when an external impact is applied to the driver protection structure; and a second stopper restricting the movement of the driver's cabin in the vertical direction in a certain range when the external impact is applied to the driver protection structure.

2. The driver protection structure and the device supporting the same as claimed in claim 1, wherein the front protection structure is hinged to the roof protection structure fixed to an upper side of the driver's cabin, enabling openings and closings thereof with rotations about a hinge axis.

3. The driver protection structure and the device supporting the same as claimed in claim 2, further comprising an elastic means between the front protection structure and the driver's cabin to facilitate the openings and closings of the front protection structure.

4. The driver protection structure and the device supporting the same as claimed in claim 3, wherein the elastic means is a gas spring.

5. The driver protection structure and the device supporting the same as claimed in claim 1, wherein the first stopper is a protrusion protruded from the bottom plate of the driver's cabin, the protrusion being blocked by a step formed on the upper frame.

6. The driver protection structure and the device supporting the same as claimed in claim 1, wherein the first stopper is a protrusion protruded from the upper frame, the protrusion being blocked by a step formed on the bottom plate of the driver's cabin.

7. The driver protection structure and the device supporting the same as claimed in claim 1, wherein one end of the second stopper passes through a through-hole formed in the upper frame and is fixed to the bottom plate of the driver's cabin, and the other end thereof is a bolt formed with a separation-preventing step.

8. The driver protection structure and the device supporting the same as claimed in claim 1, wherein one end of the second stopper passes through a through-hole formed in the bottom plate of the driver's cabin and is fixed in one body to the upper frame, and the other end thereof is a bolt formed with a separation-preventing step.

9. The driver protection structure and the device supporting the same as claimed in any of claims 1 to 8, wherein the first stopper is mounted in the rear of the driver's cabin and the second stopper is mounted in the front of the driver's cabin.

* * * * *